(12) United States Patent
Briercliffe (10) Patent No.: US 10,827,147 B1
(45) Date of Patent: Nov. 3, 2020

(54) VIDEO COUPLER

(71) Applicant: Product Development Associates, Inc., Burnsville, MN (US)

(72) Inventor: Bradley Vernon Briercliffe, Burnsville, MN (US)

(73) Assignee: Product Development Associates, Inc., Burnsville, MN (US)

( * ) Notice: Subject to any disclaimer, the term of this patent is extended or adjusted under 35 U.S.C. 154(b) by 0 days.

(21) Appl. No.: 16/502,511

(22) Filed: Jul. 3, 2019

(51) Int. Cl.
*H04N 7/01* (2006.01)
*H04N 7/10* (2006.01)

(52) U.S. Cl.
CPC ................. *H04N 7/01* (2013.01); *H04N 7/10* (2013.01)

(58) Field of Classification Search
CPC .................................. H04N 7/01; H04N 7/10
See application file for complete search history.

(56) References Cited

U.S. PATENT DOCUMENTS

| 5,805,808 | A | * | 9/1998 | Hasani | G06F 13/385 370/392 |
| 2005/0060421 | A1 | * | 3/2005 | Musunuri | H04N 19/61 709/231 |
| 2010/0226377 | A1 | * | 9/2010 | Ogasahara | H04L 12/437 370/400 |

* cited by examiner

*Primary Examiner* — Michael E Teitelbaum
(74) *Attorney, Agent, or Firm* — Mueting Raasch Group

(57) ABSTRACT

An encoder apparatus includes an encoder input, an encoder output, and processing circuitry. The encoder input may receive at least native video data. The encoder output may transmit Ethernet frames. The processing circuitry may be operably coupled to the encoder input and encoder output. The processing circuitry may be configured to receive a video frame of native video data from the encoder input. The processing circuitry may be further configured to generate an Ethernet frame including a video segment of the video frame. The processing circuitry may still further be configured to transmit the Ethernet frame including the video segment using the encoder output.

22 Claims, 9 Drawing Sheets

VIDEO COUPLER

The present disclosure pertains to systems and methods for transmitting real-time video using Ethernet frames that include video segments.

Sharing live, or real-time, video for remote monitoring may utilize specialized hardware designed for specific video formats. This specialized hardware may have built-in limits to the number of live video connections allowed, which may make expansion and customization difficult and costly. At times, adding even a single video destination or output may require the entire video sharing system to be replaced. Additionally, video conversion hardware and/or software may also be needed to allow sharing and communication between video sources and destinations further adding to the complexity of such systems.

SUMMARY

Native video data can be transmitted using Ethernet frames to allow real-time video transmission to one or more destinations that is format and network agnostic. Native video data may be divided into video segments that are transmitted in Ethernet frames and reconstructed into video frames and ultimately native video data at a destination. Video segments may include an accompanying, or associated, video segment number indicating a position of a video segment in a video frame of native video data. Ethernet frames may be transmitted directly to a destination or to a multicast address allowing transmission to any number of destinations.

An exemplary encoder apparatus may include an encoder input to receive at least native video data, an encoder output to transmit Ethernet frames, and processing circuitry operably coupled to the encoder input and encoder output. The processing circuitry may be configured to receive a video frame of native video data from the encoder input, generate an Ethernet frame comprising a video segment of the video frame, and transmit the Ethernet frame comprising the video segment using the encoder output.

In one or more embodiments, the video segment may include at least a portion of a video line. The video segment may include a horizontal video line. The generated video segment may include lossless pixel data. In one or more embodiments, the generated Ethernet frame may further include a video segment number that indicates the position of the video segment in the frame of the native video data.

In one or more embodiments, the processing circuitry may be further configured to receive user input data and/or sound data from the encoder input. The processing circuitry may generate an Ethernet frame including at least a portion of the input and/or sound data and an out-of-band segment number that indicates a type of the input and/or sound data. The processing circuitry may transmit the Ethernet frame comprising the input and/or sound data.

In one or more embodiments, the generated Ethernet frame may further include an indicator to ignore cyclic redundancy check errors. The generated Ethernet frame may further include a multi-cast address. The video segment may include chrominance- and luminance-encoded pixel data.

An exemplary decoder apparatus may include a decoder input to receive Ethernet frames, a decoder output to transmit at least native video data, and processing circuitry operably coupled to the decoder input and decoder output. The processing circuitry may be configured to receive Ethernet frames, each Ethernet frame comprising a video segment of a video frame of native video data. The processing circuitry may be configured to reconstruct the native video data based on the received Ethernet frames. The processing circuitry may be configured to transmit the native video data using the decoder output.

In one or more embodiments, to reconstruct a video frame of the native video data, the processing circuitry may further be configured to place each video segment of a single video frame in a video frame buffer. Each Ethernet frame may further include a video segment number corresponding to the position of the video segment in the video frame and the native video data is reconstructed based on at least the video segment number of each Ethernet frame.

In one or more embodiments, the processing circuitry may further be configured to receive at least one Ethernet frame comprising user input and/or sound data and an out-of-band segment number. The processing circuitry may further be configured to determine a type of data based on the out-of-band segment number. The processing circuitry may further be configured to transmit the input and/or audio data based on the determined type of data using the decoder output.

In one or more embodiments, the video segment may include lossless pixel data. In one or more embodiments, the processing circuitry may be configured to ignore a cyclic redundancy check of the Ethernet frame. The processing circuitry may be configured to convert chrominance- and luminance-encoded pixel data of the Ethernet frame to Red Green Blue (RGB) color space pixel data.

An exemplary system may include at least one encoder apparatus and at least one decoder apparatus communicatively coupled to the encoder apparatus. The encoder apparatus may include an encoder input to receive at least native video data, an encoder output to transmit frames, and encoder processing circuitry operably coupled to the encoder input and encoder output. The encoder processing circuitry may be configured to receive native video data comprising at least a video frame from the encoder input, generate frames, each frame comprising a video segment of the video frame, and transmit the frames using the encoder output. The at least one decoder apparatus may include a decoder input to receive frames, a decoder output to transmit at least native video data, and decoder processing circuitry operably coupled to the decoder input and decoder output. The decoder processing circuitry may be configured to receive the transmitted frames, reconstruct the native video data based on the received frames, and transmit the native video data using the decoder output.

In one or more embodiments the at least one decoder apparatus may be communicatively coupled to the at least one encoder apparatus via an Ethernet cable. The at least one decoder apparatus may be communicatively coupled to the at least one encoder apparatus via a switch. The at least one decoder apparatus may include two or more decoder apparatus. In one or more embodiments, the at least one encoder apparatus may include a first and second encoder apparatus, and the at least one decoder apparatus may further include a switch to allow a user to switch between outputting native video data based on data received from the first or second encoder apparatus. In one or more embodiments, the generated, transmitted, and received frames may be Ethernet frames. The received native video data and the reconstructed native video data may be different native video data formats.

BRIEF DESCRIPTION OF THE DRAWINGS

Throughout the specification, reference is made to the appended drawings, where like reference numerals designate like elements, and wherein.

DETAILED DESCRIPTION

Exemplary methods, apparatus, and systems shall be described with reference to FIGS. 1-9. It will be apparent to one skilled in the art that elements or processes from one embodiment may be used in combination with elements or processes of the other embodiments, and that the possible embodiments of such methods, apparatus, and systems using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

In general, the present disclosure describes various embodiments of encoder and decoder apparatus that are adapted to transmit and receive Ethernet frames that include video segments of native video data. The disclosure herein will use the terms "native video data," "video segment," and "video line." As used herein, it is to be understood that native video data may include video frames including pixel data, horizontal synchronization tags, and vertical synchronization tags. Native video data may be synchronized by a free running clock source that generates a consistent time base for the transmission of data. The atomic unit of video data may be a pixel. A pixel may be assigned a unique color value. Pixels may be transmitted on each "tick," or discrete event, of the clock source. A set of pixels may be generated left to right forming a complete horizontal video line. Horizontal video lines may be sent one after another, top-to-bottom to form a complete video frame. By sending many video frames each second, an observer may interpret these many static video frames, or pictures, as smooth motion video.

As described herein, native video data formats may have a clock source, a set of pixels, and a set of horizontal video lines. Differences in the native video data formats may include the speed of the clock, how many bits define the color of a pixel, how many pixels form a horizontal video line, and how many horizontal video lines "make up" a complete video frame. The illustrative apparatus, systems, and methods described herein can accommodate an arbitrary pixel size, any number of pixels per line, and any number of lines per frame; therefore, the illustrative apparatus, systems, and methods described herein may be described as being capable of handling any native video data format.

Besides pixels, native video data may include horizontal and vertical synchronization tags that mark the end of horizontal video lines and the end of complete video frames. Native video data may be sent over a deterministic, reliable link and it may be assumed that all data transmitted will be received in order and in time. With native video data, there may be no method to decode an arbitrary component within the video. For example, a receiver of native video data may wait for a vertical synchronization tag to occur to determine, or know, when a new frame of video has started. Once the vertical tag has been detected, the receiver may maintain a lock on the original clock source so the receiver can correctly interpret the video data.

Beyond the synchronization tags and pixel data, other products may be included in digital streams of native video data such as, e.g., out-of-band data (e.g., audio data, user or other device input, etc.). The illustrative apparatus, systems, and methods described herein can also transmit and receive such out-of-band data. The out-of-band data may be provided with an indicator that indicates the type of data.

A video line may include as lossless data representative of a horizontally or vertically contiguous line of pixels of a video frame of native video data. A video segment may include lossless data representative of a subset of a single native video frame of native video data arranged in a manner such that the native video can be reconstructed from such video segments. Each video segment may be associated with a segment number. Each segment number may indicate a predetermined location within a frame of native video data for each pixel of the video segment based on the order of the pixels in the video segment. For example, video segments may include a video line. In another example, the video segment may include a series of pixels that are spaced apart every 1920th pixel of the video frame. The segment number may indicate the position of the first pixel of the video segment, and each pixel thereafter is spaced 1920 pixels away from the pixel preceding it. In a still further example, the video segment may represent a rectangular section of pixels of the native video data and the segment number indicates the position of the rectangular segment in the native video frame.

Illustrative methods, apparatus, and systems may be described as allowing for transmitting lossless video data using Ethernet protocols. Transmitting lossless video data using Ethernet protocols allows encoders and decoders to be connected in various configurations including directly or through network switching apparatus. For example, one or more video sources may be simultaneously transmitted in real-time to one or more destinations without regard to the native video data format of the sources or destinations. Additionally, encoder apparatus (e.g., sources) and decoder apparatus (e.g., destinations) may be added and removed at will because the encoder and decoder apparatus may be modular in design. Furthermore, encoders and decoders may handle or process any native video data format without requiring additional hardware or software.

Figure 1:
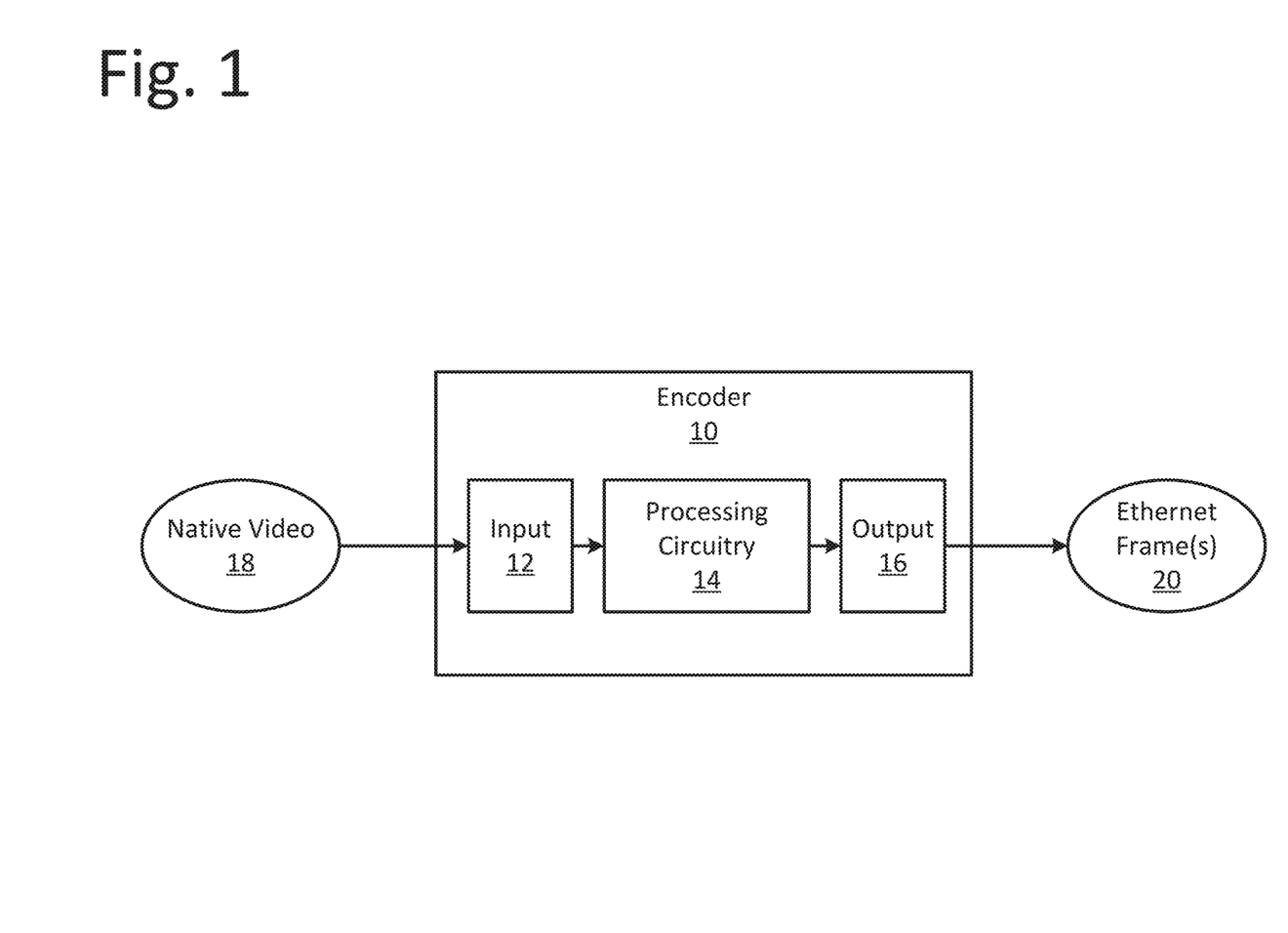
FIG. 1 is a schematic diagram of an encoder apparatus according to one embodiment for use with the illustrative systems, apparatus, and methods described herein.

An exemplary encoder apparatus 10 for generating Ethernet frames 20, each frame including a video segment of a video frame of native video 18, is depicted in FIG. 1. The encoder apparatus 10 may include an encoder input 12, processing circuitry 14, and an encoder output 16. The encoder input 12 may be configured to, or adapted to, receive native video data 18. The encoder input 12 may include any suitable connector or interface for receiving native video data 18 such as, e.g., Video Graphics Array (VGA), RS-343A, High-Definition Multimedia Interface (HDMI), Digital Visual Interface (DVI), DisplayPort (DP), carried as DisplayPort protocol over USB 3.0, 3.1, National Television Standard Committee (NTSC)-RS170, etc. The encoder input 12, may be operably coupled to and receive native video data from any suitable source such as, e.g., a computer, a video camera, a live video feed, sensor video products, etc. Additionally, the encoder input 12 may be operably coupled to any other suitable device to receive non-video data such as, e.g., a computer mouse, a keyboard, a universal serial bus (USB) device, a microphone, or any input device that provides a digital discrete signaling levels (e.g., selector switch or security switch, status indicators, etc.). The encoder input may receive non-video or out-of-band data such as, e.g., input and/or sound data. Further, the encoder input 12 may be operatively coupled to the processing circuitry 14 to provide the received native video data and/or out-of-band data to the processing circuitry 14.

The processing circuitry 14 may receive one or more video frames of the native video data from the encoder input 12. Once a video frame, or portion thereof, has been received, the processing circuitry 14 may generate a plurality of Ethernet frames 20, each Ethernet frame including a video segment of the received video frame or portion until the entire video frame has been packaged into video segments within the Ethernet frames 20. The processing circuitry 14 may be operably coupled to the encoder output 16 to provide Ethernet frames to the encoder output 16. Thus, after each Ethernet frame 20 has been generated, the processing circuitry 14 may transmit the Ethernet frame using the encoder output 16.

The processing circuitry 14 may include any suitable hardware or devices to read video data, generate Ethernet frames 20, convert video data formats, count video segments, generate video segment lines, determine out-of-band data types, package and encode the native video data 18 or out-of-band data into an appropriate payload for the Ethernet frames, accept and act on configuration parameters that control the generation of the Ethernet frames, etc. The processing circuitry 14 may include, e.g., one or more processors, logic gates, clocks, queues and First-In-First-Out (FIFO) for holding intermediate data packages, Electro-Static Discharge (ESD) protection circuitry for input and output signals, line drivers and line receivers for interfacing to external devices, etc. The processing circuitry 14 may be provided in a Field-Programmable Gate Array (FPGA), a circuit board, a system on a chip, a fixed or mobile computer system (e.g., a personal computer or minicomputer), implemented in software, etc. In one example, processing circuitry 14 is implemented in an FPGA.

The exact configuration of the processing circuitry 14 is not limiting and essentially any device capable of providing suitable computing capabilities and video signal processing capabilities (e.g., read video data, generate Ethernet frames 20, convert video data formats, etc.) may be used. Further, various peripheral devices, such as a computer display, mouse, keyboard, memory, printer, scanner, etc. are contemplated to be used in combination with the processing circuitry 14 or encoder apparatus 12. Further, in one or more embodiments, data (e.g., native video data, video segments, video lines, out-of-band data, synchronization tags, etc.) may be analyzed by a user, used by another machine that provides output based thereon, etc. As described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writeable by processing circuitry 14 described herein. Also, as described herein, a file in user-readable format may be any representation of data (e.g., ASCII text, binary numbers, hexadecimal numbers, decimal numbers, audio, graphical) presentable on any medium (e.g., paper, a display, sound waves, etc.) readable and/or understandable by a user.

In view of the above, it will be readily apparent that the functionality as described in one or more embodiments according to the present disclosure may be implemented in any manner as would be known to one skilled in the art. As such, the computer language, the computer system, or any other software/hardware that is to be used to implement the processes described herein shall not be limiting on the scope of the systems, processes, or programs (e.g., the functionality provided by such systems, processes, or programs) described herein.

The methods described in this disclosure, including those attributed to the systems, or various constituent components, may be implemented, at least in part, in hardware, software, firmware, or any combination thereof. For example, various aspects of the techniques may be implemented by the processing circuitry 14, which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary methods and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions on a computer-readable medium such as RAM, ROM, NVRAM, EEPROM, FLASH memory, magnetic data storage media, optical data storage media, or the like. The instructions may be executed by the processing circuitry 14 to support one or more aspects of the functionality described in this disclosure.

The processing circuitry 14 may be further described as being configured to receive any native video data 18 stream and to generate and transmit Ethernet frames 20 including data representative of the native video data 18. Each Ethernet frame 20 generated by processing circuitry 14 may include a video segment that represents a portion of a video frame of the native video data 18. Video segments may include lossless pixel data. As used herein, lossless indicates data representation, compression, and/or conversion where no information about the original pixel of the native video data 18 is lost. In one example, the native video data 18 is encoded in the red-green-blue (RGB) color space. Ethernet frames may have the raw capacity to carry native digital video products. For example, a native video data stream with a resolution of 3840 pixels by 2160 lines with 32-bit pixels updating 60 times a second may generate 3840*2160*4*60=2 gigabytes (16 gigabits) of data per second which may be within the capacity of 25 gigabit Ethernet. Reducing the pixel size (color depth) from 32 bits to 16 bits may drop the bandwidth need to 8 gigabit which fits on existing 10 gigabit bandwidths.

Reducing the color depth from 32 bits to 16 bits may not impact the original image quality. Although many native video generators allocate 32 bits (4 bytes) to each pixel, only 3 of those bytes may typically carry color and intensity information; one byte each for the red, green, and blue primary colors that defines the pixel. The 4th byte may often be used to store overlay information that is not part of the original video image. A further reduction from this actual 24-bit pixel data to 16 bits can be accomplished by using other color space encodings. The 24-bit RGB encoding may merge color information along with intensity (brightness) information across each of the 3 bytes of the primary colors that defines the pixel. In one sense, the intensity information is replicated three times, once for each of the red, green, and blue values. By separating the intensity data from the color data, a reduction to 2 bytes per pixel may be possible. This may be known as intensity-chrominance encoding scheme (Crib). The intensity field may describe the raw brightness of the pixel, then the remaining data may describe the ratio of red and blue color. The amount of green may be derived by the difference in intensity from the red and blue ratios. Although the color space can be set to accommodate different Ethernet frame capacities, methods, apparatus, and systems described herein may be color space agnostic.

When the processing circuitry 14 generates the Ethernet frame 20, the video segment of the Ethernet frame may include chrominance- and luminance-encoded pixel data. Chrominance and luminance encoding may also be known as intensity-chrominance encoding. The intensity or luminance indicates the brightness of a pixel and the chrominance indicates the ratio of red and blue color of the pixel. The amount of green in the pixel can be derived from the difference between the intensity of the pixel and the red and blue ratio of the pixel. Using chrominance and luminance encoding may allow the pixel data to be represented using less data than RGB encoding without losing any information about the pixels. In other words, chrominance and luminance encoding may be described as a form of lossless pixel data encoding.

The encoder output 16 may transmit Ethernet frames 20. The encoder output 16 may include any suitable connector or interface for transmitting Ethernet frames or other data such as, e.g., an Attachment Unit Interface (AUI), an N connector, a vampire tap, a Bayonet Neill-Councilmen (BNC) connector, Small Form Factor Pluggable (SFP+), Registered Jack (RJ), etc. The encoder output 16 may be operatively coupled to any suitable device, e.g., a network, a computer, a switch, a decoder device, a network bridging device, a range extender, etc. The encoder output 16 may transmit the Ethernet frames 20 to any of the operatively coupled devices. Packaging the video segments into Ethernet frames 20 may allow for the video data (e.g., video frames) to be transmitted through generic networks, switches, and/or routers. Further, packaging the video segments into Ethernet frames may allow real-time transmission of video data from any operatively coupled source to any operably coupled destination without regard to the native video data 18 format or the destination video data format.

In some examples, the encoder input 12 may be configured to receive out-of-band data such as, e.g., input and/or sound data. The processing circuitry 14 may be configured to generate an Ethernet frame including at least a portion of the out-of-band data. Additionally, the processing circuitry 14 may be configured to generate the Ethernet frame further including an out-of-band segment number that indicates a type of the input and/or sound data. Out-of-band segment numbers are segment numbers that do not indicate a position of a video segment within a video frame but instead indicate order of the out-of-band data. Out-of-band segment numbers may include, e.g., negative numbers, numbers exceeding a threshold number, or any other number that does not indicate a position of a video segment within a video frame.

Figure 2:
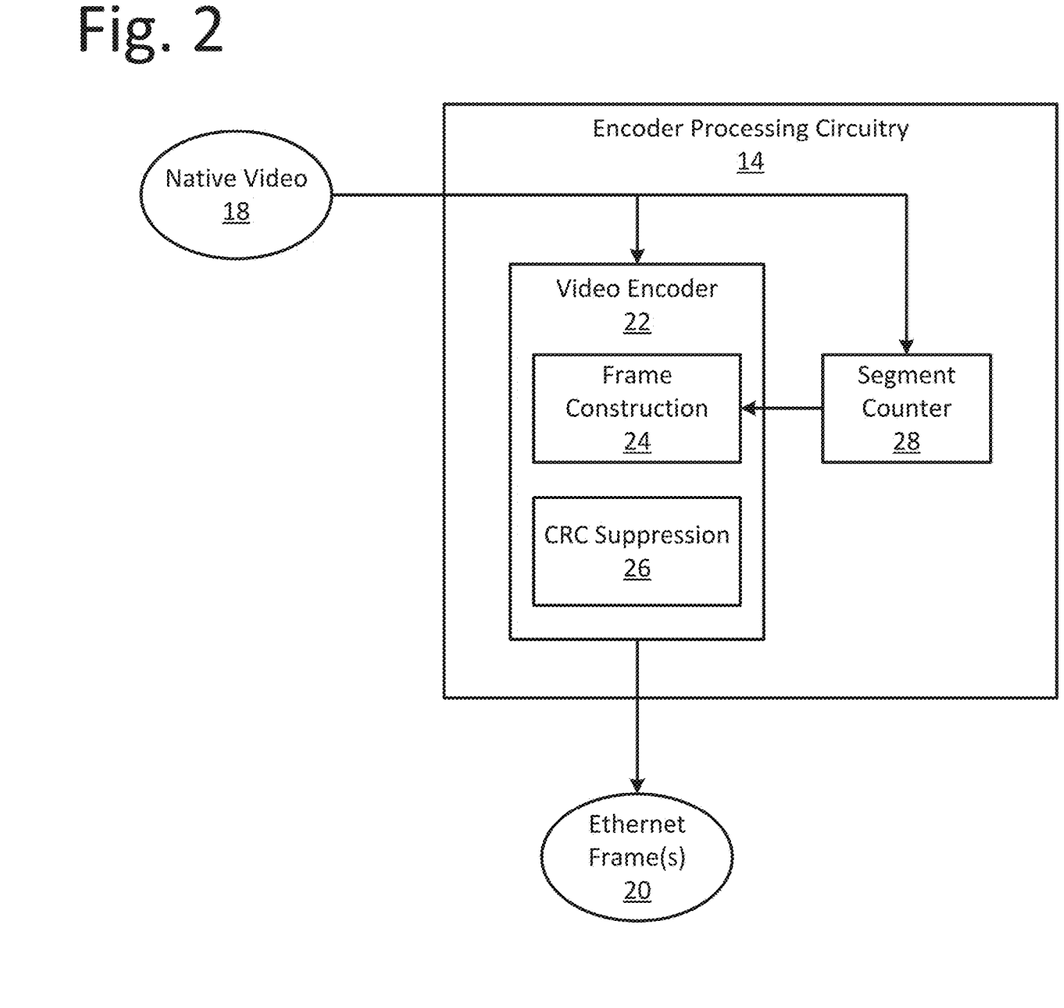
FIG. 2 is a schematic diagram of encoder processing circuitry of the encoder apparatus of FIG. 1.

Exemplary encoder processing circuitry 14 for generating Ethernet frames 20 including a video segment of a video frame of native video 18 is depicted in FIG. 2. Encoder processing circuitry 14 may include a video encoder 22 and a segment counter 28. The video encoder 22 may include frame construction circuitry 24 and cyclic redundancy check (CRC) suppression circuitry 26. The native video data 18 may be received by the video encoder 22 and the segment counter 28.

The segment counter 28 may be configured to provide a segment number to the frame construction circuitry 24 during Ethernet frame generation. The provided segment number may be based on the position of the video segment position in a video frame of native video data 18. For example, if the video segment is a horizontal video line, the segment number may indicate which horizontal video line within a video frame the video segment represents. The video encoder 22 may generate an Ethernet frame 20 including a video segment and the segment number provided by the segment counter 28. In some examples, the video encoder 22 is configured to generate a video segment that includes at least a portion of a video line. A video line may be a contiguous line of pixels of a video frame. In at least one example, the video line may be a horizontal video line. In other examples, the video line may be a vertical video line. In one example, the video encoder 22 converts the pixel data of the native video to chrominance- and luminance-encoded pixel data to generate a video segment.

In general, native video data streams (e.g., native video data 18) may be assumed to be deterministic (e.g., transmission time is consistent, based on a clock source, etc.), reliable (all data sent will be received), and lossless (no reduction in data fidelity). However, Ethernet protocols may be neither deterministic nor inherently reliable. It may not be possible to guarantee the delivery order of Ethernet frames 20; they can arrive out of order. Native video streams may not have this problem; lines may typically arrive in sequence order. To solve the out-of-order problem each of Ethernet frames 20 may include a segment number that identifies the position of the video segment position in a video frame of native video data 18. The segment number may ensure the video frame can be reassembled in the correct order. By encoding a video segment within an Ethernet frame (e.g., Ethernet frames 20), it may be possible to maintain the relative placement of pixels within a video frame. Additionally, such protocols may ensure there is no loss of content, thereby providing a lossless protocol.

Adding segment numbers may partially solve the segment level determinism issue. To completely solve the determinism issue for segment lines, the bandwidth of the encoder apparatus 10 of FIG. 1 may be slightly larger than the native video data bandwidth requirement. For example, if the native video generates 8 Gigabits of data per second, the encoder output may have slightly more than 8 Gigabit of bandwidth such as, e.g., 10 Gigabits. The processing circuitry 14 may add a small amount of overhead to the base data set so this extra bandwidth may accommodate the additional data. If the encoder apparatus 10 and/or connected Ethernet cables and/or devices do not have sufficient bandwidth for the generated Ethernet frames 20, some number of Ethernet frames 20 may be lost in transmission and many may be received out of order creating both a reliability and determinism issue.

The video encoder 22 may suppress Cyclic Redundancy Checks (CRCs) using CRC suppression circuitry 26. In one example, the CRC is suppressed by setting a CRC checksum of the generated Ethernet frame to zero. Typically, Ethernet frames may include and be protected by CRCs to address reliability issues. For example, CRCs may ensure any corruption of Ethernet frames will be detected. Any Ethernet frame with any amount of corruption may be discarded; including Ethernet frames with a single bit error. This approach may ensure that data that arrives is correct, but it may not ensure the data set is complete. Such an approach may not be compatible with native video transports. When native video data is corrupted, the bad video data may be passed on and assumed good because there may not be a method to detect errors in native video transports. Because pixels have a short life span (e.g., 16 milliseconds) it may be deemed better to display a bad pixel than incur the overhead to detect and correct any errors. Adapting Ethernet frames to this philosophy may mean removing the CRC. With the CRC removed, the Ethernet frame will be passed on without checking for errors. Because Ethernet frames are well formed (e.g., the layout and structure is known ahead of time), it may be possible to detect and correct many errors that would affect the Ethernet frame header information (e.g., length, data type, routing information). Any errors that occur in the payload (e.g., pixel data) may be processed without error detection or correction like native video data. The relative sizes of the Ethernet frame header to the Ethernet frame payload means that it is statistically far more likely that data corruption will affect the payload which may be deemed acceptable.

The generated Ethernet frame 20 may include a destination address. The destination address may include any suitable address type such as, e.g., a direct address, a multicast address, or a broadcast address. In at least one embodiment, the Ethernet frame 20 includes a multicast address.

Figure 3:
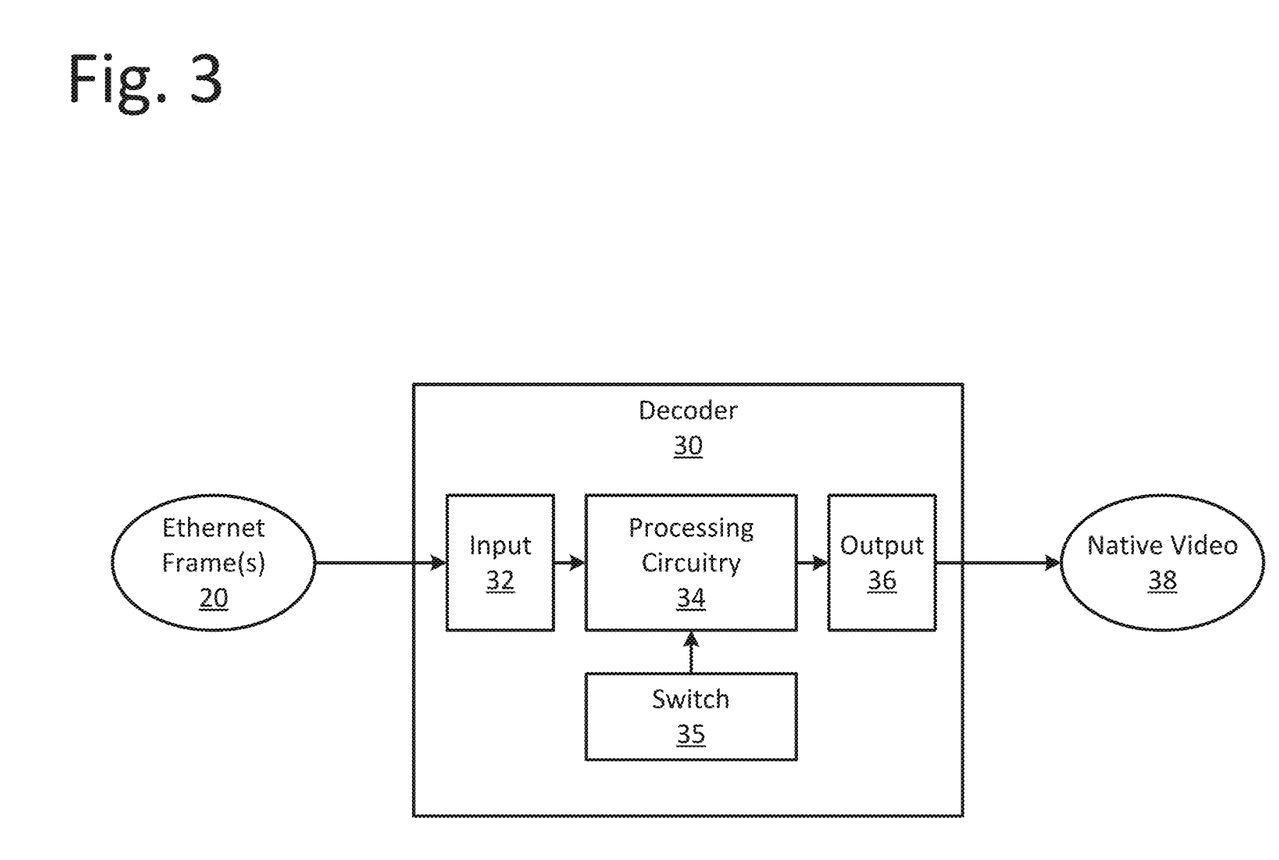
FIG. 3 is a schematic diagram of a decoder apparatus according to one embodiment for use with the illustrative systems, apparatus, and methods described herein.

An exemplary decoder apparatus 30 to reconstruct native video data 38 based on received Ethernet frames 20 is depicted in FIG. 3. As depicted in FIG. 3, native video data 38 may represent reconstructed native video (e.g., native video data 18 of FIGS. 2 and 3). Reconstructed native video data 38 may have slight or negligible differences from original native video data when CRCs and other data integrity checks are suppressed or disabled.

The decoder apparatus 30 may include a decoder input 32, processing circuitry 34, switch 35, and decoder output 36. The decoder input 32 may include any suitable connector or interface for receiving Ethernet frames or other data, e.g., an Attachment Unit Interface (AUI), an N connector, a vampire tap, a Bayonet Neill-Councilmen (BNC) connector, Small Form Factor Pluggable (SFP+), Registered Jack (RJ), etc. The decoder input 32 may be communicatively coupled to any suitable device, e.g., a network, a computer, a switch, a decoder device, a network bridging device, a range extender, etc. The processing circuitry 34 may receive one or more Ethernet frames 20 from the decoder input 32. Once one or more Ethernet frames 20 including video data have been received, the processing circuitry 34 may reconstruct native video data 38 based on the received Ethernet frames. After the native video data 38 has been reconstructed, the processing circuitry 34 may transmit the native video data using the decoder output 36 to an output device (e.g., a monitor, a television, etc.). The processing circuitry 34 may include any suitable hardware or devices to reconstruct the native video data 38. The processing circuitry 34 may include, e.g., one or more processors, logic gates, clocks, buffers, memory, decoders, queues and First-In-First-Out (FIFO) for holding intermediate data packages, Electro-Static Discharge (ESD) protection circuitry for input and output signals, line drivers and line receivers for interfacing to external devices, etc. The processing circuitry 34 may be provided in a Field-Programmable Gate Array (FPGA), a circuit board, a system on a chip, a computer, implemented with software, etc. In one example, processing circuitry 34 is implemented in an FPGA. In other words, chrominance and luminance encoding is a form of lossless pixel data encoding. The exact configuration of the processing circuitry 34 is not limiting and may be similar to configurations previously discussed herein with respect to the processing circuitry 14 of FIG. 1.

Thus, the processing circuitry 34 may be configured to receive Ethernet frames 20 and to reconstruct and transmit native video data 38. Each Ethernet frame 20 received by processing circuitry 34 may include a video segment that represents a portion of a video frame of native video data 38. Video segments may include lossless pixel data. As used herein, "lossless" indicates data representation, compression, and/or conversion wherein no information about the original pixel of the native video data 18 is lost. In some examples, the video segments of the Ethernet frames 20 may include chrominance- and luminance-encoded pixel data. Chrominance and luminance encoding may also be known as intensity-chrominance encoding. The intensity or luminance indicates the brightness of a pixel and the chrominance indicates the ratio of red and blue color of the pixel. The intensity or luminance value of the pixel may be stored in one byte of data and the chrominance value of the pixel may be stored in another byte of data. The amount of green in the pixel can be derived from the difference between the intensity of the pixel and the red and blue ratio of the pixel. Using chrominance and luminance encoding allows the pixel data to be represented using less data than RGB encoding, which uses three bytes of data, without losing any information about the pixels.

As described herein, the decoder apparatus 30 may further include a switch 35 operably coupled to processing circuitry 34 to allow a user to select between native video data sources that decoder 30 is operably coupled to. For example, a plurality of native video data streams may be transmitted about a network that the decoder apparatus 30 is operably coupled to, and the decoder apparatus 30 may switch between the plurality of native video data streams using the switch 35. The switch 35 may include any suitable device such as, e.g., a toggle, button, knob, USB device, etc. Further, the switch 35 may be implemented using a combination of software and hardware. For example, software may reside on a user's computer that is operably coupled to the decoder apparatus 30, and such software may be used to control the switch 35. The decoder output 36 may include any suitable connector or interface for receiving and transmitting native video data 18, e.g., Video Graphics Array (VGA), RS-343, High-Definition Multimedia Interface (HDMI), Digital Visual Interface (DVI), a DisplayPort (DP), carried as DisplayPort protocol over USB 3.0, 3.1, National Television Standard Committee (NTSC)-RS170, etc. The decoder output 36, may be operably coupled to and receive native video data from processing circuitry 34. Additionally, the decoder output 36 may be operably coupled to any other suitable device to provide native video data 18 such as, e.g., a computer, a monitor, a television, projection screen, other video transmission device, etc. Furthermore, the decoder output 36 may receive and provide non-video or out-of-band data such as, e.g., input and/or sound data. The decoder output 36 may be operably coupled to any other suitable device to provide out-of-band data such as, e.g., a computer, a speaker, indicator lights, USB device, etc. For example, the decoder output 36 may include a USB port to provide out-of-band input data and/or a 3.5 mm audio jack to provide audio data. In other words, the decoder output 36 may provide the received native video data and/or out-of-band data to any operably coupled devices, and the decoder output 36 may include any interface to do so.

In some examples, the decoder input 32 may be configured to receive Ethernet frames 20 that include out-of-band data (e.g., input and/or sound data) and out-of-band segment numbers. The processing circuitry 34 may be configured to determine a type of the out-of-band data based on the out-of-band segment number. Additionally, the processing circuitry 34 may be configured to transmit the out-of-band data based on the determined type of data using the decoder output 36. Out-of-band segment numbers are segment numbers that do not indicate a position of a video segment within a video frame. Out-of-band segment numbers may include, e.g., negative numbers, numbers exceeding a threshold number, or any other number that does not indicate a position of a video segment within a video frame.

Figure 4:
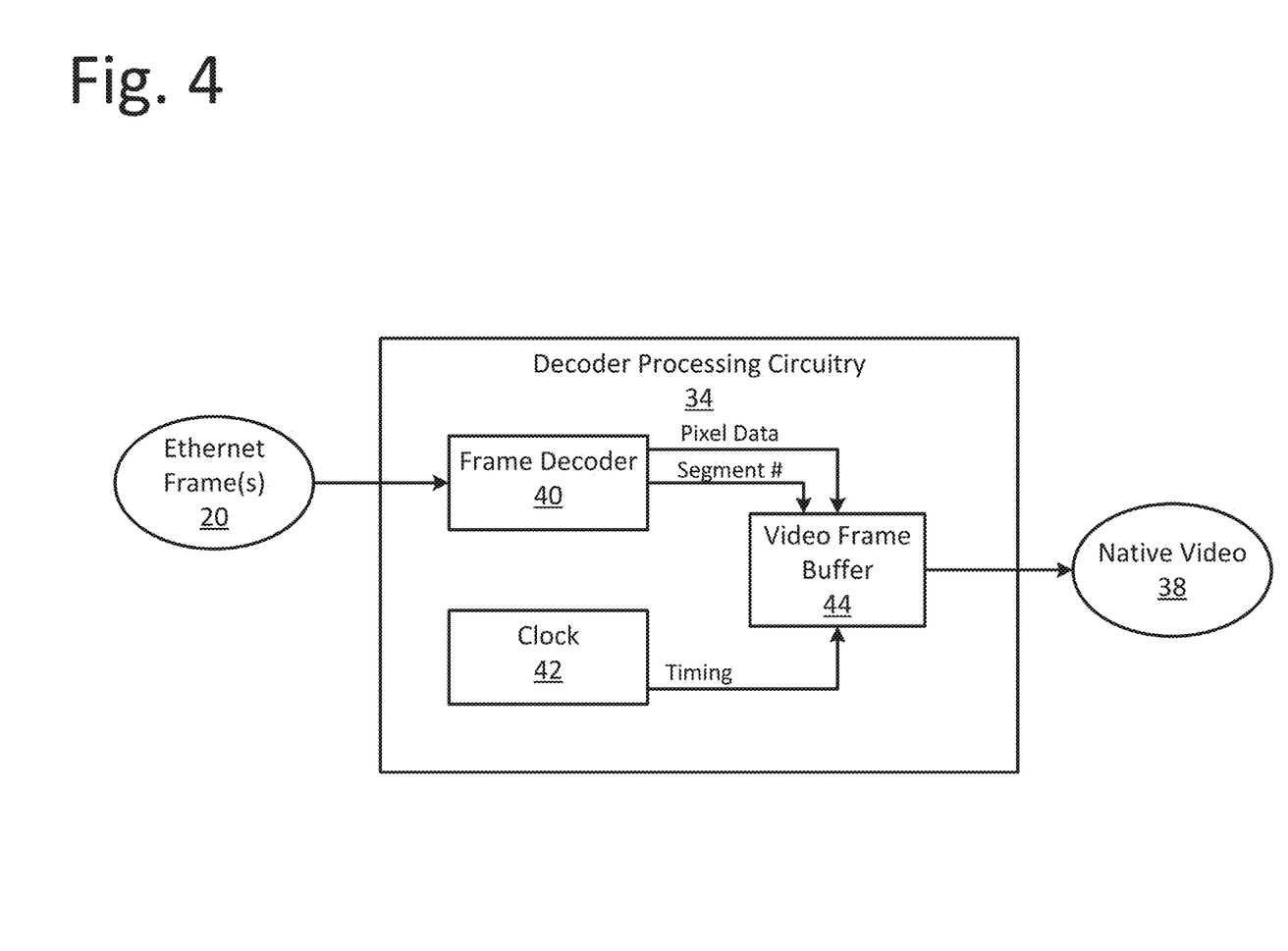
FIG. 4 is a schematic diagram of the decoder processing circuitry of the decoder apparatus of FIG. 3.

Exemplary decoder processing circuitry 34 for reconstructing native video data 38 from Ethernet frames 20 including video segments is depicted in FIG. 4. The decoder processing circuitry 34 may include a frame decoder 40, a clock 42, and a video frame buffer 44. Ethernet frames may be received by the frame decoder 40 of the processing circuitry 34 via the decoder input 32 as shown in FIG. 3.

The frame decoder 40 may extract pixel data from the video segments of the Ethernet frames and place the pixel data in the video frame buffer 44 based on the accompanying, or associated, segment numbers. The segment numbers may indicate the position of the accompanying, or associated, video segment within a video frame and/or the video frame buffer 44. The clock 42 may be used to control reading and/or transmission of the data in the video frame buffer 44. Each pixel may be retrieved from the frame buffer line by line and transmitted as native video data including horizontal and vertical synchronization tags based on the clock 42. This memory fetching may run independently thereby restoring the original characteristics of native video; that is being lossless, deterministic, and reliable.

The bandwidth of the decoder apparatus 30 of FIG. 3 may be slightly larger than the native video data bandwidth requirement. For example, if the native video generates 8 Gigabits of data per second, the decoder apparatus may have slightly more than 8 Gigabit of bandwidth such as, e.g., 10 Gigabits. Ethernet frames 20 may include some amount of overhead in addition to the base data set so this extra bandwidth can accommodate the additional data. If the decoder apparatus 30 and/or connected Ethernet cables and/or devices do not have sufficient bandwidth for the generated Ethernet frames 20, some number of Ethernet frames 20 may be lost in transmission and many may be received out of order creating both a reliability and determinism issue.

Figure 5:
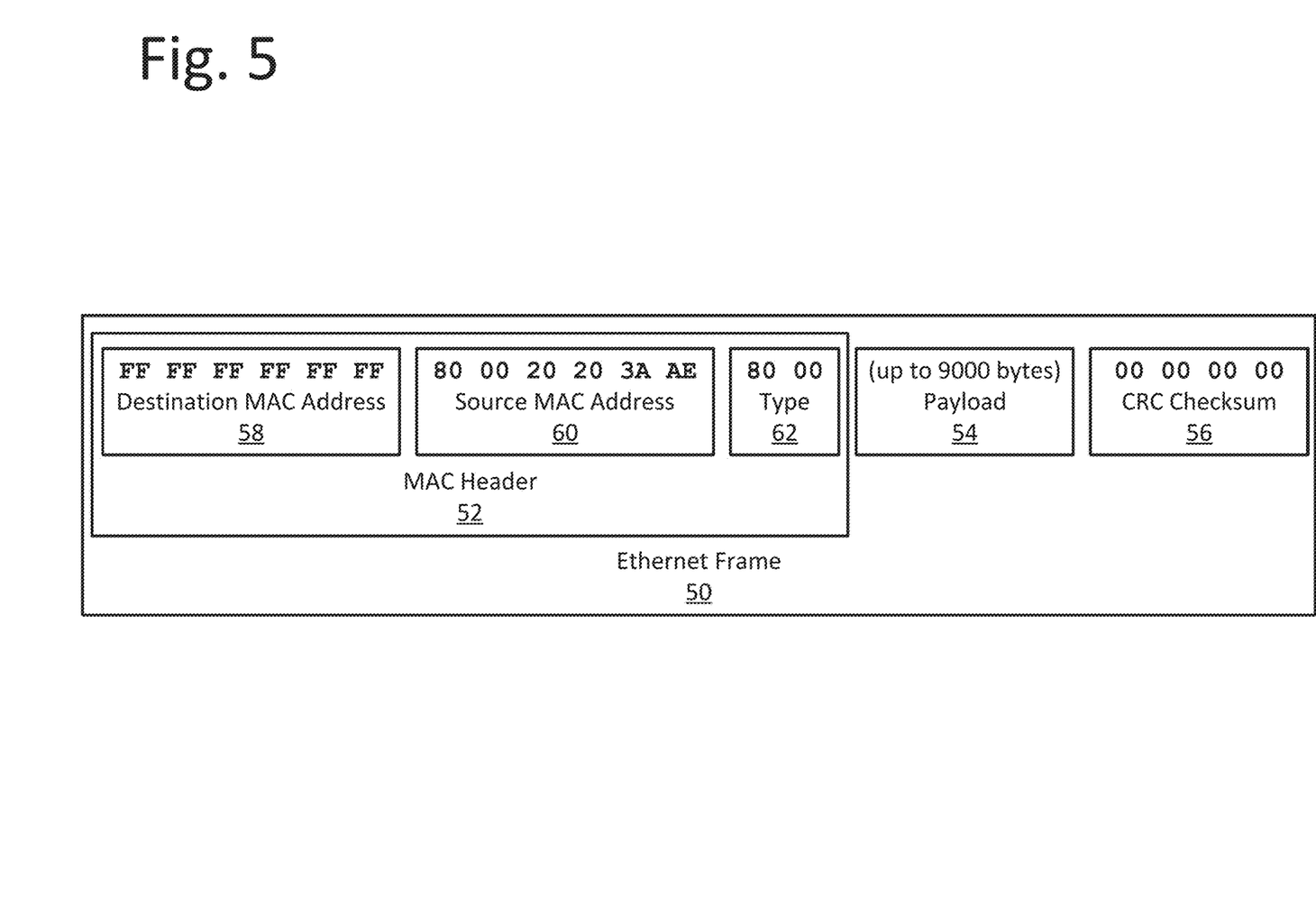
FIG. 5 is a schematic diagram of an Ethernet frame.

An exemplary Ethernet frame 50 is depicted in FIG. 5. Ethernet frame 50 may be a protocol data unit of the data link layer of the Open Systems Interconnection (OSI) model. Ethernet frame 50 may include a Media Access Control (MAC) header 52, a payload 54, and a CRC checksum 56. The MAC header 52 may include a destination MAC address 58, a source MAC address 60, and a frame type 62. The destination MAC address 58 may include six bytes of data, each byte represented herein as couplings of hexadecimal digits. In one embodiment, the destination MAC address 58 may indicate a multicast group that the Ethernet frame 50 is to be transmitted to. In another embodiment, the destination MAC address 58 may not be a multicast address and may be a direct MAC address. The source MAC address 60 may include six bytes of data, each byte represented herein as couplings of hexadecimal digits. The source MAC address 60 may indicate the MAC address of the apparatus that generated the Ethernet frame 50. The frame type 62 may indicate what type or kind of Ethernet frame that Ethernet frame 50 is, such as, e.g., standard, jumbo, baby giant, super jumbo, etc. In at least one example, Ethernet frame 50 is a jumbo frame. The Ethernet frame 50 may be any Ethernet frame as defined by the IEEE 802.3 Standard for Ethernet, which is incorporated herein by reference in its entirety.

The size of the payload 54 may be determined by the type of Ethernet frame. The Ethernet frame type and the corresponding payload size may be chosen based on the size of the data to be to be transmitted. The payload 54 may include a video segment and a segment number. Accordingly, the size of the Ethernet frame type of Ethernet frame 50 and the corresponding size of payload 54 may be chosen based on the size of the video frame to be transmitted. In at least one example, the Ethernet frame 50 is a jumbo frame and the size of the payload 54 may be up to 9000 bytes.

Ethernet frame 50 may include the CRC checksum 56. CRC checksums may be used to verify the integrity of Ethernet frame 50. However, for real-time transmission of video data, it may be beneficial to ignore cyclic redundancy checks. In some examples (e.g., real-time video transmission), speed may be more important than data integrity. The CRC checksum 56 may be set to zero to indicate that the cyclic redundancy check is to be suppressed or ignored.

Figure 6:
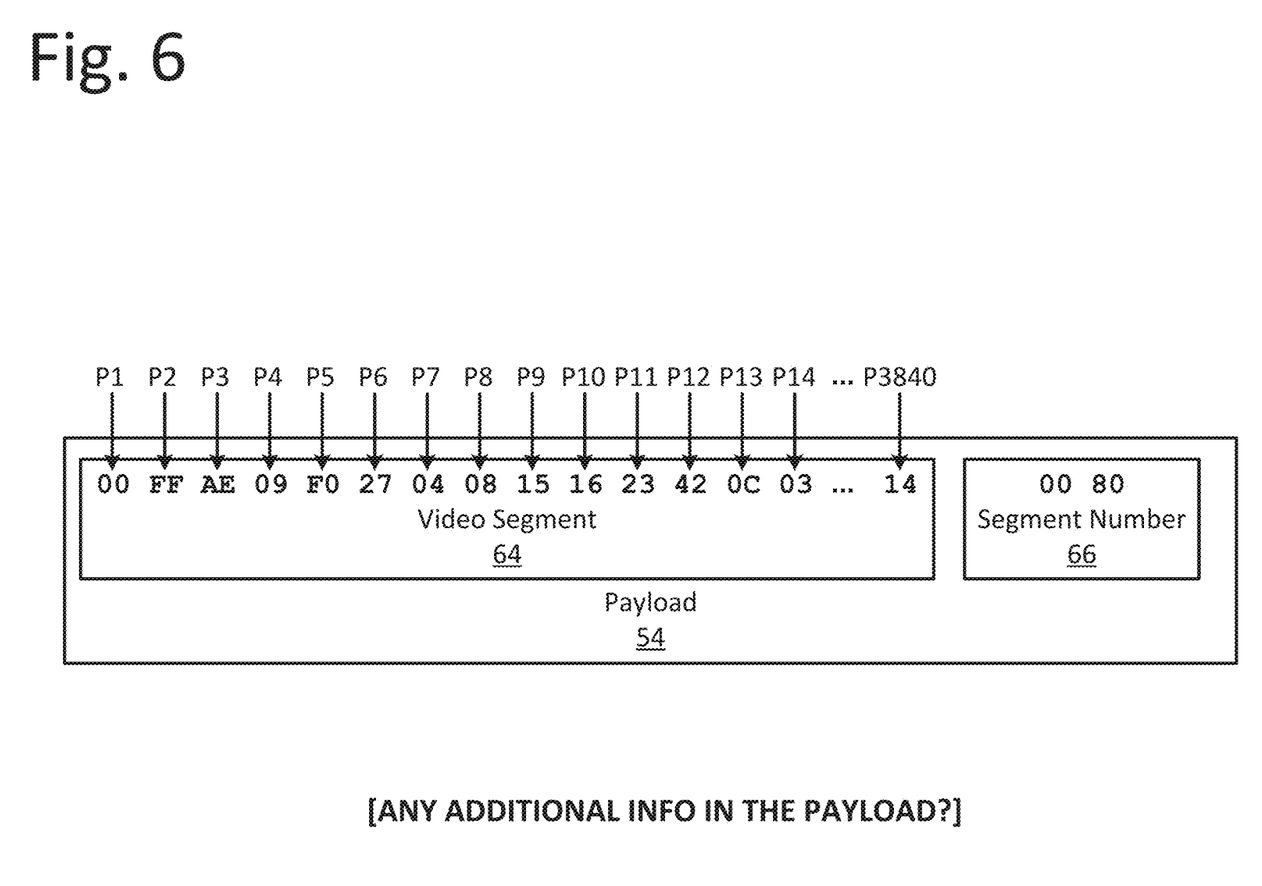
FIG. 6 is a schematic diagram of an illustrative payload of the Ethernet frame of FIG. 5 for use with the illustrative systems, apparatus, and methods described herein.

An exemplary payload 54 is depicted in FIG. 6. Payload 54 may include a video segment 64 and a segment number 66. The video segment 64 may include bytes of data (depicted in FIG. 6 as couplets of hexadecimal digits) that are representative of pixels P1-P3840. The segment number 66 may indicate the position of the pixels P1-P3840 of the video segment 64 within a video frame of native video data.

Figure 7:
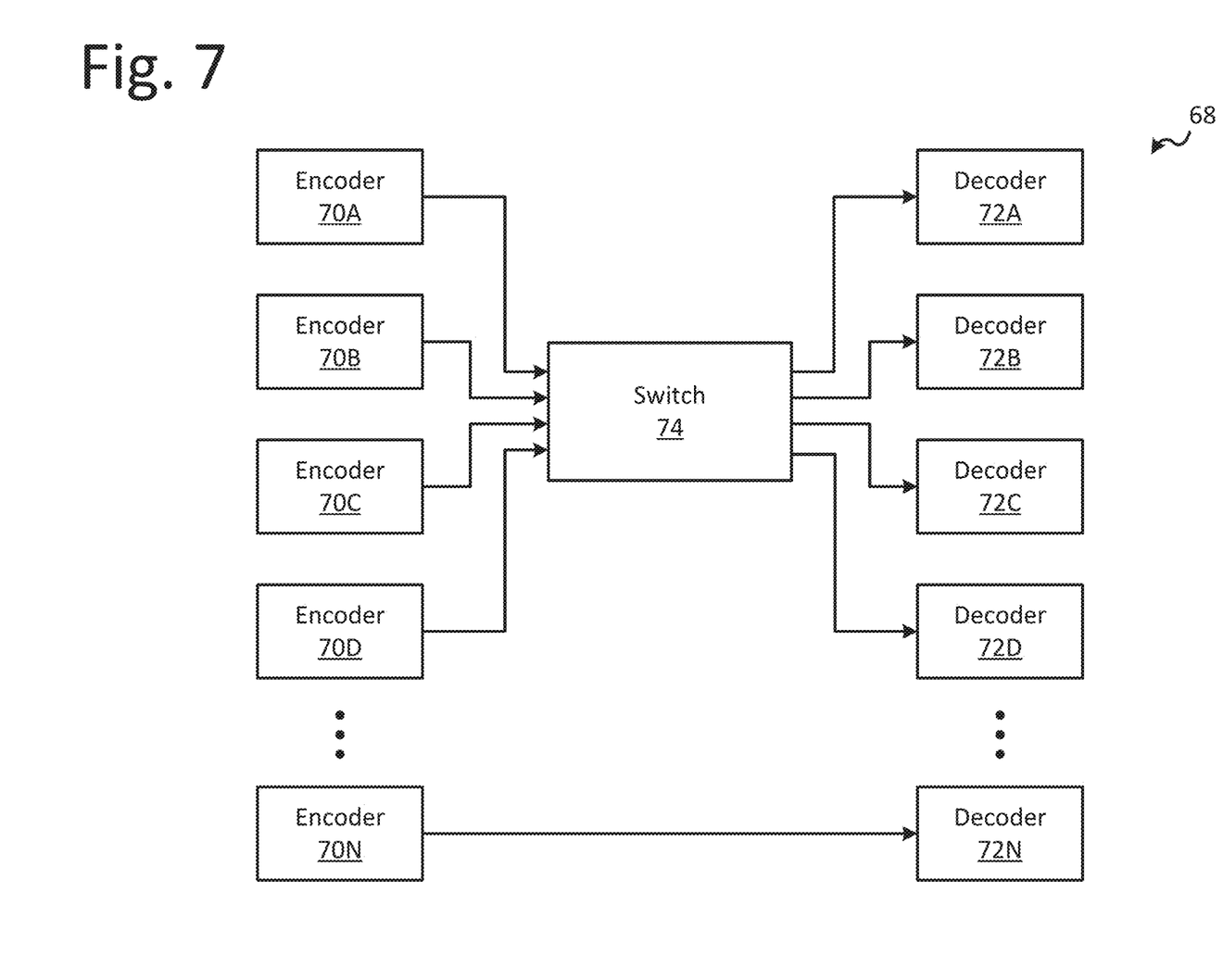
FIG. 7 is a schematic block diagram of illustrative video coupling systems.

Exemplary video coupling systems 68 are depicted in FIG. 7. The video coupling system 68 may include encoder apparatus 70A-70N (referred to collectively as encoder apparatus 70), a switch 74, and decoder apparatus 72A-72N (referred to collectively as decoder apparatus 72). The encoder apparatus 70 may include the devices, circuitry, and functionality of the encoder apparatus 10 and the processing circuitry 14 of FIGS. 1-2. The decoder apparatus 72 may include the devices, circuitry, and functionality of the decoder apparatus 30 and processing circuitry 34 of FIGS. 3-4.

The video coupling system 68 may include any number of encoder apparatus 70 and any number of decoder apparatus 72. Encoder apparatus 70 may be communicatively coupled to decoder apparatus 72. In some examples encoder apparatus 70 are communicatively coupled to decoder apparatus 72 via the switch 74 (e.g., encoder apparatus 70A-70D and decoder apparatus 72A-72D). The switch 74 may include any suitable network switch, e.g., Ethernet switch, bridging hub, MAC bridge, switching hub, network bridge, repeater, router, wireless router, wireless network switch, etc. The encoder apparatus 70 may transmit frames to the switch 74 and the switch 74 may route the Ethernet frames to the appropriate decoder apparatus 72 (e.g., direct or multicast). The frames transmitted by the encoder apparatus 70 may include, e.g., Ethernet frames, etc. In at least one example, the frames transmitted by the encoder apparatus 70 may be Ethernet frames. Each of the decoder apparatus 72 may selectively output native video data of any of the encoder apparatus 70. In other words, each of the decoder apparatus 72 may include a switch, user input device, or toggle (e.g., switch 35 if FIG. 3) to switch or select between outputting native video data received based on data received from any communicatively coupled encoder apparatus 70.

In some examples, encoder apparatus 70 may be directly coupled to decoder apparatus 72 (e.g., encoder apparatus 70N and decoder apparatus 72N). Directly coupled, as used herein, refers to a coupling between devices that does not include any intermediate data routing device such as network switch 74. The encoder apparatus 70 and the decoder apparatus 72 may be directly coupled via any suitable data transmission medium, e.g., Ethernet cable, coaxial cable, twisted pair wiring, radio waves, fiber optic cable, free space laser, etc. In at least one example, the encoder apparatus 70 and the decoder apparatus 72 may be directly coupled via Ethernet cable.

In some examples, decoder apparatus 72 may be communicatively coupled to one or more encoder apparatus 70 via a switch (e.g., switch 74) and communicatively coupled to one or more encoder apparatus 70 directly. Each of the decoder apparatus 72 may selectively output native video data of any of the communicatively coupled encoder apparatus 70. In other words, each of the decoder apparatus 72 may include a switch, user input device, or toggle (e.g., switch 35 if FIG. 3) to switch or select between outputting native video data received based on data received from any communicatively coupled encoder apparatus 70.

The bandwidth of all encoder apparatus 70, decoder apparatus 72, switch 74, and any intervening cable or device of video coupling system 68 may be slightly larger than the native video data bandwidth requirement. For example, if the native video generates 8 Gigabits of data per second, the video coupling system 68 may have slightly more than 8 Gigabit of bandwidth such as, e.g., 10 Gigabits. Ethernet frames 20 may include some amount of overhead in addition to the base data set so this extra bandwidth can accommodate the additional data. If the video coupling system 68 and/or connected Ethernet cables and/or devices do not have sufficient bandwidth for the generated Ethernet frames 20, some number of Ethernet frames 20 may be lost in transmission and many may be received out of order creating both a reliability and determinism issue.

Figure 8:
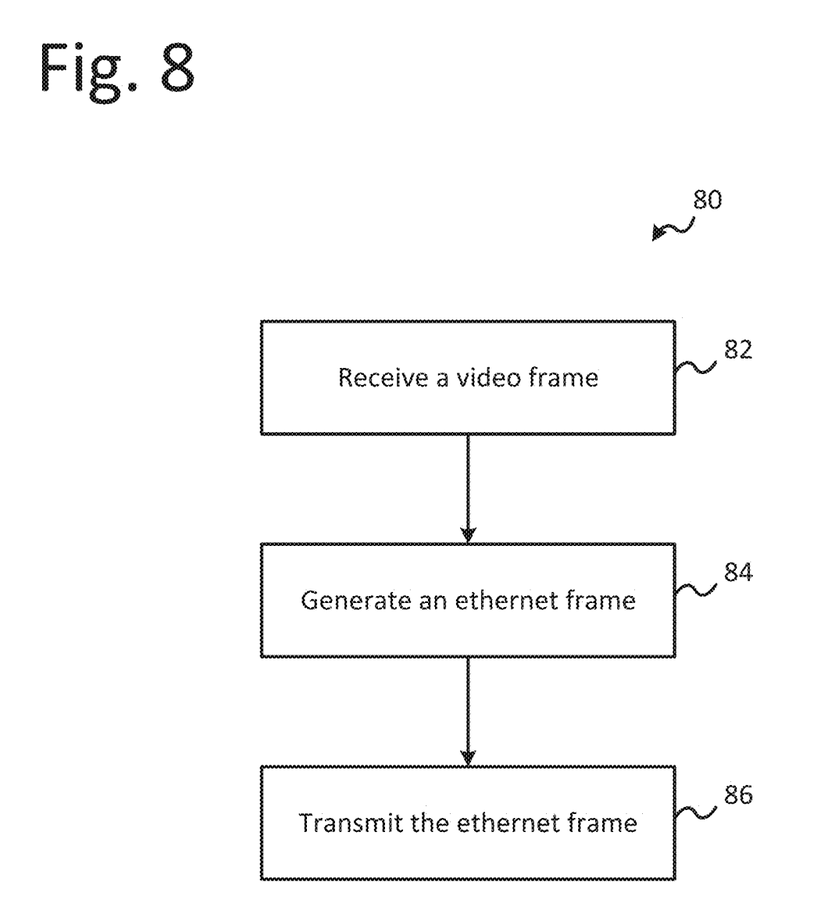
FIG. 8 is a flow diagram of an illustrative method for generating an Ethernet frame including a video segment of native video data.

An exemplary technique, or process 80, for generating an Ethernet frame including a video segment of native video data is depicted in FIG. 8. The process 80 may include receiving a video frame 82, generating and Ethernet frame 84, and transmitting and Ethernet frame 86.

A video frame may be received 82 using an encoder input (e.g., encoder input 12 of FIG. 1). An Ethernet frame may be generated 84 based on the received video frame. The generated Ethernet frame may include a video segment of the video frame. Additionally, the generated Ethernet frame may include a segment number that indicates a position of the video segment in the video frame. The Ethernet frame may be generated 84 using processing circuitry (e.g., processing circuitry 14 of FIGS. 1-2). The generated Ethernet frame may be transmitted 86 using an encoder output (e.g., decoder output 16). The generated Ethernet frame may be transmitted 86 to one or more decoder apparatus (e.g., decoder apparatus 30 of FIG. 3).

Figure 9:
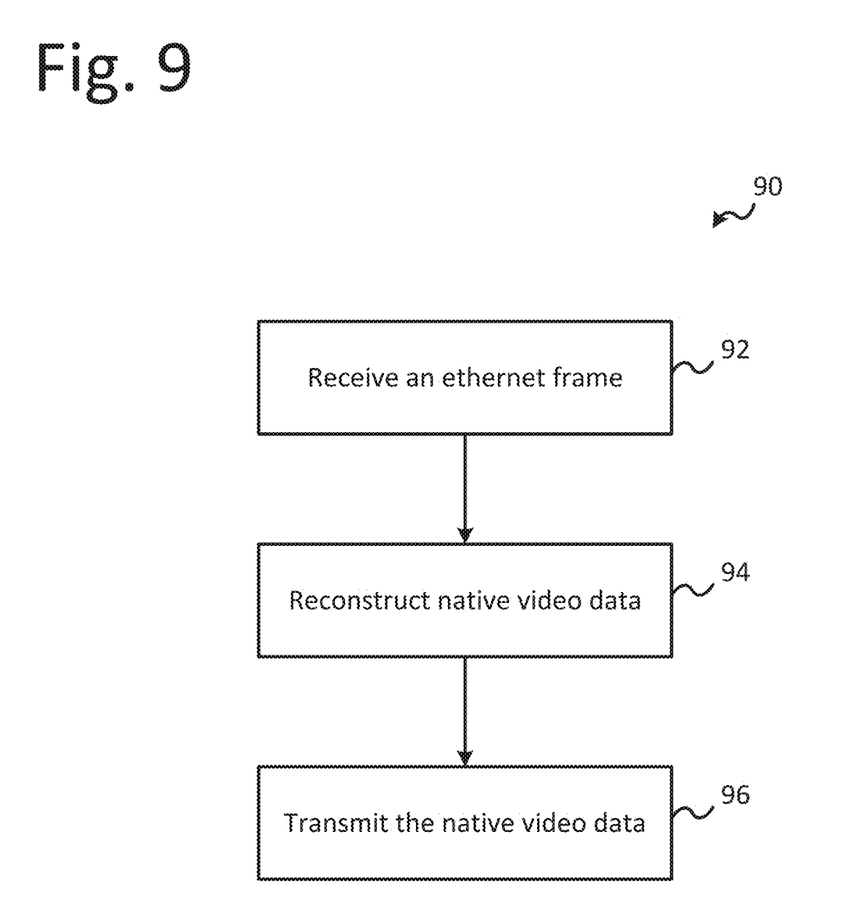
FIG. 9 is a flow diagram of an illustrative method of reconstructing native video data based on Ethernet frames, each Ethernet frame.

An exemplary technique, or process 90, for reconstructing native video data from Ethernet frames is depicted in FIG. 9. The process 90 may include receiving an Ethernet frame 92, reconstructing native video data 94, and transmitting the native video data 96.

Ethernet frames may be received 92 using a decoder input (e.g., decoder input 32 of FIG. 3). Native video data may be reconstructed 94 based on the received Ethernet frames. Received Ethernet frames may include video segments and segment numbers. Reconstructing native video data may include placing video segments in a video frame buffer (e.g., video frame buffer 44 of FIG. 4). Additionally, the video segments may be placed in the video frame buffer based on the segment number that accompanied the video segments in the Ethernet frames. In other words, the segment number of each Ethernet frame indicates the position of the video segment included in the Ethernet frame in a video frame. The reconstructed video data may be transmitted 96 using a decoder output (e.g., decoder output 36 of FIG. 3). The reconstructed video data may be transmitted 96 in response to the frame buffer being filled. Transmitting the reconstructed video data 96 may include transmitting a video frame. Additionally, the frame buffer may be emptied in response to the video frame being transmitted.

All references and publications cited herein are expressly incorporated herein by reference in their entirety into this disclosure, except to the extent they may directly contradict this disclosure. Illustrative embodiments of this disclosure are described and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

The invention claimed is:

1. An encoder apparatus comprising:
   an encoder input to receive at least native video data;
   an encoder output to transmit Ethernet frames; and
   processing circuitry operably coupled to the encoder input and encoder output and configured to:
      receive a video frame of native video data from the encoder input;
      generate an Ethernet frame comprising a video segment of the video frame;
      transmit the Ethernet frame comprising the video segment using the encoder output;
      receive user input data and/or sound data from the encoder input;
      generate an Ethernet frame comprising at least a portion of the input and/or sound data and an out-ofband segment number that indicates a type of the input and/or sound data; and
transmit the Ethernet frame comprising the input and/or sound data.

2. The apparatus of claim 1, wherein the video segment comprises at least a portion of a video line.

3. The apparatus of claim 1, wherein the video segment comprises a horizontal video line.

4. The apparatus of claim 1, wherein the generated video segment comprises lossless pixel data.

5. The apparatus of claim 1, wherein the generated Ethernet frame further comprises a video segment number that indicates the position of the video segment in the frame of the native video data.

6. The apparatus of claim 1, wherein the generated Ethernet frame further comprises an indicator to ignore cyclic redundancy check errors.

7. The apparatus of claim 1, wherein the generated Ethernet frame further comprises a multi-cast address.

8. The apparatus of claim 1, wherein the video segment comprises chrominance- and luminance-encoded pixel data.

9. A decoder apparatus comprising:
a decoder input to receive Ethernet frames;
a decoder output to transmit at least native video data; and
processing circuitry operably coupled to the decoder input and decoder output and configured to:
receive Ethernet frames, each Ethernet frame comprising a video segment of a video frame of native video data;
reconstruct the native video data based on the received Ethernet frames;
transmit the native video data using the decoder output;
receive one or more Ethernet frames comprising out-of-band data and an out-of-band segment number, the out-of-band data comprising input and/or sound data;
determine a type of the out-of-band data based on the out-of-band segment number; and
transmit the out-of-band data comprising input and/or sound data based on the determined type of data using the decoder output.

10. The apparatus of claim 9, wherein to reconstruct a video frame of the native video data, the processing circuitry is further configured to place each video segment of a single video frame in a video frame buffer.

11. The apparatus of claim 9, wherein each Ethernet frame further comprises a video segment number corresponding to the position of the video segment in the video frame and the native video data is reconstructed based on at least the video segment number of each Ethernet frame.

12. The apparatus of claim 9, wherein the processing circuitry is further configured to:
receive at least one Ethernet frame comprising user input and/or sound data and an out-of-band segment number;
determine a type of data based on the out-of-band segment number; and
transmit the input and/or audio data based on the determined type of data using the decoder output.

13. The apparatus of claim 9, wherein the video segment comprises lossless pixel data.

14. The apparatus of claim 9, wherein the processing circuitry is configured to ignore a cyclic redundancy check of the Ethernet frame.

15. The apparatus of claim 9, wherein the processing circuitry is configured to convert chrominance- and luminance-encoded pixel data of the Ethernet frame to Red Green Blue (RGB) color space pixel data.

16. A system comprising:
at least one encoder apparatus comprising:
an encoder input to receive at least native video data;
an encoder output to transmit frames; and
encoder processing circuitry operably coupled to the encoder input and encoder output and configured to:
receive native video data comprising at least a video frame from the encoder input;
generate frames, each frame comprising a video segment of the video frame;
transmit the frames using the encoder output;
receive user input data and/or sound data from the encoder input;
generate frames comprising out-of-band data and an out-of-band segment number, the out-of-band data comprising input and/or sound data; and
transmit the frames comprising the out-of-band data and the out-of-band segment number; and
at least one decoder apparatus communicatively coupled to the encoder apparatus, the decoder apparatus comprising:
a decoder input to receive frames;
a decoder output to transmit at least native video data; and
decoder processing circuitry operably coupled to the decoder input and decoder output and configured to:
receive the transmitted frames;
reconstruct the native video data based on the received frames;
transmit the native video data using the decoder output;
receive the frames comprising out-of-band data and an out-of-band segment number;
determine a type of the out-of-band data based on the out-of-band segment number; and
transmit the out-of-band data comprising input and/or sound data based on the determined type of data using the decoder output.

17. The system of claim 16, wherein the at least one decoder apparatus is communicatively coupled to the at least one encoder apparatus via an Ethernet cable.

18. The system of claim 16, wherein the at least one decoder apparatus is communicatively coupled to the at least one encoder apparatus via a switch.

19. The apparatus of claim 16, wherein the at least one decoder apparatus comprises two or more decoder apparatus.

20. The apparatus of claim 16, wherein the at least one encoder apparatus comprises a first and second encoder apparatus, and
wherein the at least one decoder apparatus further includes a switch to allow a user to switch between outputting native video data based on data received from the first or second encoder apparatus.

21. The apparatus of claim 16, wherein the generated, transmitted, and received frames are Ethernet frames.

22. The apparatus of claim 16, wherein the received native video data and the reconstructed native video data are different native video data formats.

* * * * *